United States Patent [19]

Boersen et al.

[11] Patent Number: 5,782,011
[45] Date of Patent: Jul. 21, 1998

[54] DEVICE AND METHOD FOR PREPARING A SPRAY-DRIED PRODUCT

[75] Inventors: Antonius Cornelus Boersen, Hillegom; Antonius Johannes Maria Bouman, Drachten, both of Netherlands

[73] Assignee: Stork Friesland B.V., Gorredijk, Netherlands

[21] Appl. No.: 635,292

[22] Filed: Apr. 19, 1996

[30] Foreign Application Priority Data

Jun. 20, 1995 [NL] Netherlands ............... 1000611

[51] Int. Cl.[6] ............................................. F26B 3/08
[52] U.S. Cl. ............................ 34/366; 34/370; 34/585
[58] Field of Search ........................... 34/364, 366, 370, 34/371, 372, 373, 375, 582, 585, 589, 591, 594

[56] References Cited

U.S. PATENT DOCUMENTS

| | | |
|---|---|---|
| 3,571,946 | 3/1971 | Essen. |
| 3,735,792 | 5/1973 | Asizawa et al. ............... 159/4 |
| 3,817,280 | 6/1974 | Celani ............... 137/592 |
| 3,956,521 | 5/1976 | Pisecky et al. ............... 426/588 |
| 4,441,892 | 4/1984 | Schuster ............... 48/197 |
| 5,248,387 | 9/1993 | Hansen ............... 159/48.1 |
| 5,426,868 | 6/1995 | Yamada et al. ............... 34/591 |
| 5,615,493 | 4/1997 | Funder ............... 34/583 |

FOREIGN PATENT DOCUMENTS

| | | |
|---|---|---|
| 2015941 | 4/1970 | France. |
| 2417336 | 9/1979 | France. |
| 2125155 | 11/1972 | Germany. |
| 2758080 | 7/1979 | Germany. |
| 8602952 | 6/1988 | Netherlands. |

Primary Examiner—Henry A. Bennett
Assistant Examiner—Pamela A. O'Connor
Attorney, Agent, or Firm—Quarles & Brady

[57] ABSTRACT

A device for preparing a spray-dried product includes a drying chamber with a distribution element placed therein for atomizing liquid to be spray-dried, an element for supplying drying gas, an element supplying a stream of solid particles to a stream of droplets atomized from the distribution element, and one or more fluidized beds, each having at least one bottom plate with openings which has gas supply structure opening out at the underside thereof. These fluidized beds are placed connected to each other inside the drying chamber, opposite the distribution element, the above in such a way that the combined streams of droplets from the distribution element and solid particles fall essentially into the first bed, and conveyance of material from the first bed to the second bed can take place.

13 Claims, 2 Drawing Sheets ably large size. During the passage through the drying
DEVICE AND METHOD FOR PREPARING A SPRAY-DRIED PRODUCT The present invention relates to a device for preparing a spray-dried product, at least comprising a drying chamber with a distribution element placed therein for atomizing liquid to be spray-dried, means for supplying drying gas, and one or more fluidized beds, each comprising at least one bottom plate with openings which has gas supply means opening out at the underside thereof.

BACKGROUND OF THE INVENTION

Such a device is generally known and is used for spray-drying liquids to form solid products. The products concerned here are products such as, for example, yeast, whey, skimmed milk and whole milk.

One example of such a device which can be mentioned is the wide-body spray-drying into a drying chamber of relatively large size. During the passage through the drying chamber, the stream of droplets from the distribution element is dried. A fluidized bed, which is integral with the drying chamber, is present in the bottom of the device, in which fluidized bed the already largely dried particles are dried further and/or cooled. An external fluidized bed is possibly also present, in order to dry the particles even further if possible and/or to cool them down.

Another example of the abovementioned device is the so-called spray-drying agglomeration device, which device has an essentially similar structure to the earlier mentioned wide-body drier, but in which the size of the drying chamber is considerably smaller. The latter is due to the fact that the drying of the liquid sprayed into the drying chamber takes place essentially in the fluidized bed situated at the underside of the device. In this case also, an external fluidized bed is usually present, in order to dry the particles further and/or to cool them down.

However, a disadvantage of the known spray-drying devices is that the volume of the device is relatively great. Besides, in the case of the known devices soiling of the walls often occurs, due to deposits of the particles to be spray-dried forming on the walls. This means that only a fairly short undisturbed drying cycle can take place, while the time required for cleaning the device is relatively long. In the case of the known spray-drying devices several separating devices are required for removal of the entrained solid particles from the waste gases. Besides, the temperature of these waste gases is relatively high.

SUMMARY OF THE INVENTION

The object of the present invention is to provide a device which does not have the abovementioned disadvantages, and the invention therefore provides a device according to the preamble of claim 1, which is characterized in that inside the drying chamber, opposite the distribution element, a first and a second fluidized bed are placed, said beds being connected to each other and having a first and a second bottom plate respectively with openings, the above in such a way that the combined streams of droplets from the distribution element and solid particles fall essentially into the first bed, and conveyance of material from the first bed to the second bed can take place.

The fact that both the first fluidized bed and the second fluidized bed, where the combined streams of droplets from the distribution element and solid particles are dried and dried further and/or cooled respectively, are placed inside the drying chamber of the spray-drying device ensures that complete drying of particles can take place therein.

In particular, the second fluidized bed is placed in an essentially annular manner around the first fluidized bed.

Through such an arrangement, it is possible to place the first fluidized bed centrally at the underside of the drying chamber, so that the combined stream of droplets and solid particles will fall into the bed, while the second bed is placed around the first bed. The ring surrounding the first bed does not have to be closed completely.

The first bottom plate with openings of the first fluidized bed is advantageously surrounded by a wall extending essentially parallel to the axis of the distribution element.

A further preferred embodiment of the device according to the present invention is given in claim 4.

The first fluidized bed is advantageously an ideally mixed fluidized bed in which the already partially dried combined streams of droplets from the distribution element and solid particles are received and intensively mixed with the already partially dried solid substance and warm gas. A characteristic of such an ideally mixed fluidized bed is that the residence time of the individual powder particles is variable, but the temperature of the bed and the moisture distribution of the product are homogeneous over the entire bed.

However, the second fluidized bed is preferably a plug-flow fluidized bed which is fed with gas, and the bottom plate of which has openings positioned in such a way that the already partially dried solid particles are conveyed from the first bed over the second fluidized bed, and are discharged from there. A characteristic of such a plug-flow fluidized bed is the first in first out principle. This means that the product temperature and the moisture content are not homogeneous in such a fluidized bed, but that, on the contrary, the residence time of the particles is essentially the same.

At least two gas supply means which can be controlled individually are advantageously placed at the underside of the bottom plate of the second fluidized bed, in which case the gases supplied by the separate gas supply means can differ in temperature.

In this way it is ensured that the second fluidized bed can perform two functions, that of an after-drying device, and that of a conditioning unit. If warm gas is passed through at the place where the particles are introduced into the second fluidized bed, said particles are dried further. If cold gas is passed through in a following part of the second fluidized bed, cooling of the product takes place, in order to permit sieving, conveyance, storage and packaging of the product without the product properties being adversely affected.

Since, inter alia, the air loading of the fluidized bed is essential for optimum mixing conditions in the bed, the surface of the underside of the bottom plate of the first fluidized bed is preferably partially covered by gas supply means which can be controlled individually and at that point permit a fluidizing gas stream partial flow through the corresponding part of the bottom plate which differs from the fluidizing gas stream main flow through the remaining part of the bottom plate which is not covered by said gas supply means.

This means that much better turbulent mixing conditions are achieved, and these contribute to optimum mixing.

In an expedient embodiment sold particles are fed to the stream of droplets formed in order to reach certain desired product characteristics.

In an advantageous embodiment, means are present in the device for separating fine particles from the drying chamber and supplying said particles to the stream of solid particles supplied to the stream of droplets from the distribution element.

Such a feedback system for fine, generally powdered particles from the drying chamber leads to optimum utilization of the material streams in the device.

The position of the means for supplying solid particles to the stream of droplets atomized from the distribution element is advantageously also adjustable in distance relative to the distribution element.

The present invention also relates to a method for preparing a spray-dried product, in which a liquid to be spray-dried is supplied to a distribution element which is situated inside a drying chamber and which atomizes the liquid into a stream of droplets, following which the product is dried using one or more fluidized beds. This method is characterized in that solid particles are supplied to the stream of droplets; that the ratio of the quantity by weight of solid particles to liquid supplied is greater that or equal to ½ and that a device according to the invention is used.

In the known methods according to the prior art, the ratio of the quantity by weight of solid particles to liquid is less that ½. However, if the ration of the mass flow of liquid to solid product is set in such a way that a relatively large quantity of solid product is supplied, as is the case in the method according to the present invention, the relative moisture content of the product falls virtually instantaneously when these two streams are mixed, with the result that the stickiness also decreases. This rapid fall in the moisture content of the product makes it possible to carry out the method in an extremely compact device, as in the device according to the present invention. In addition, the stream of droplets from the distribution element is stabilized, with the result that the stream is prevented from fanning out, so that primary contact of sprayed particles with the walls of the device is prevented.

In particular, the solid particles which are supplied to the stream of droplets from the distribution element comprise at least fine particles which are entrained in the upward gas stream inside the drying chamber. The quantity of fine particles entrained in this upward gas stream depends on the quantity of gas supplied to the drying chamber.

The use of such particles entrained by the upward gas stream makes optimum utilization of the feeds possible. However, it is pointed out that it always remains possible to supply a separate stream of solid particles to the stream of droplets from the distribution element.

The position at which the stream of solid particles is brought into contact with the stream of droplets from the distribution element is preferably set depending on the desired product.

The moment at which the droplets from the distribution element come into contact with the solid particles has a great influence on the drying process and the properties of the end product. If this occurs at an early stage after the atomization from the distribution element, the droplets still act like a liquid. When collisions then occur between these droplets and solid particles, an agglomerate of the capillary type, i.e. the pores present therein have a high moisture content, is produced. After complete drying thereof, the agglomerate is compact and has a low porosity. However, if the collision occurs at a later stage, the droplets from the distribution element have reached the critical moisture content and a skin has formed around each droplet, with the result that an agglomerate of the funicular or pendular type is produced. Such an agglomerate has a much higher porosity. Due to the fact that in the method according to the present invention the position at which solid particles are brought into contact with the droplets from the distribution element is adjustable, both types of agglomerates can be made according to this method.

In order to make the product stream fall into the fluidized bed where a further drying occurs, such as, for example, the first fluidized bed when the device according to the present invention is used, the solid particles must be distributed uniformly around the stream of droplets from the distribution element.

BRIEF DESCRIPTION OF THE DRAWING

The present invention will be discussed in greater detail below with reference to the appended drawing, in which:

The spray-drying device 1 according to the present invention comprises a drying chamber 2, which is cylindrical in the embodiment, shown in FIG. 1, having a constant diameter over its entire length. Placed in the top part of the drying chamber 2 is a distribution element 3, which is connected to a pipe 4 for supplying a liquid to be spray-dried. The distribution element 3 consists of, for example, a spray nozzle or a rotating disc. In addition, it is also possible to atomize the liquid to be spray-dried ultrasonically. A supply pipe 5 for supplying warm drying gas to the drying chamber 2 is also present. Reference number 6 indicates a supply system for a stream of solid particles. In FIG. 1 the supply system 6 comprises a supply pipe which opens into a tubular casing around the distribution element. By means of such a construction, it is ensured that the solid particles supplied are distributed uniformly around the stream of droplets coming out of the distribution element 3. However, it is also possible to design the shape of the supply system for solid substance particles 6 in such a way that the distance of this system from the distribution element 3 is adjustable; but it is still important to bring the solid particles in a uniform stream into contact with the stream of droplets from the distribution element 3. To this end, the supply system for solid particles 6 is preferably designed as a powder distribution system which is placed more or less concentrically around the distribution element 3, and which is advantageously movable at least in the vertical direction and can distribute relatively large quantities of solid particles. Examples of such a supply system are a concentric gap around the distribution element 3 or a number of banana-shaped circular segment gaps which are adjustable in distance relative to the distribution element 3.

Figure 1:
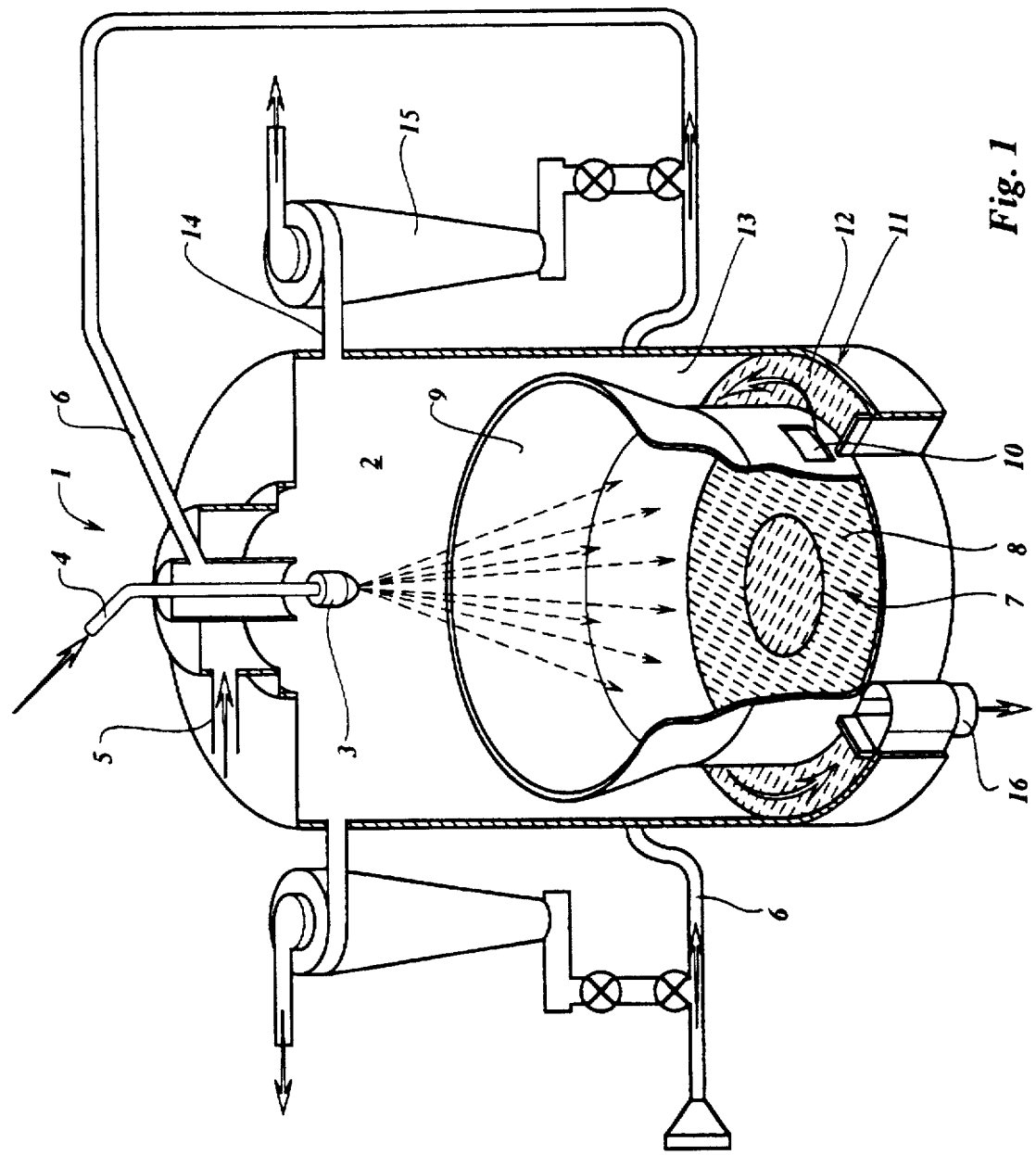
FIG. 1 shows diagrammatically, partially in section, a device according to the present invention.

Reference number 14 shows a pipe present in the wall 13 of the drying chamber 2, for discharging drying gas and fine—powder—particles present therein. By means of a separating device 15, such as, for example, a cyclone, the fine particles can be separated from the gas and returned directly by way of pipe 6 to the supply system of solid particles 6 to the stream of droplets from the distribution element 3. By this method, very economical use is made of the starting materials which are present. However, it is also possible to supply solid particles from another source to the droplets from the distribution element 3.

Situated directly below the distribution element 3 is a first fluidized bed 7, which comprises a bottom plate with openings 8 which is surrounded by a wall 9. In the embodiment shown in FIG. 1, the bottom plate 8 is circular, and the bottom part of the wall is essentially cylindrical, while the top side is conical. Of course, other embodiments of the bottom plate 8, and of the wall 9, are also possible. The first fluidized bed 7 is preferably of the ideally mixed type, and generally has a bed temperature of 60°–70° C. In FIG. 1 a so-called airbox is placed centrally at the underside of the bottom plate with openings 8, as a result of which the air load can be achieved. However, it is also possible to increase the local air load in another way. To this end, the bottom plate 8 of the first fluidized bed 7 is preferably designed in such a way that the gas passage into the central part is larger than that into the surrounding part. This is achieved by making the openings in the bottom plate 8 larger in the central part than in the surrounding part, or by providing the central part with a larger number of openings than the surrounding part.

The wall 9 of the first fluidized bed 7 is provided with an opening 10, through which particles fully or partially dried in the first fluidized bed can be conveyed from said bed to the second bed. The conveyance of particles from the first fluidized bed 7 can advantageously take place by providing such openings in the bottom plate 8 that the particles are conveyed in the direction of opening 10 by the gas supplied from the underside of the bottom plate 8.

The second fluidized bed 11 comprises a second bottom plate with openings 12, which is surrounded by both the wall 9 of the first fluidized bed and the outside wall 13 of the drying chamber. The embodiment of the bottom plate of the second fluidized bed shown in FIG. 1 is provided with openings slanting in the desired direction of conveyance, through which a gas stream is blown, so that particles conveyed from the first bed to the second bed are guided through the second bed out of the device. Although not shown in FIG. 1, only half of the second fluidized bed has temperature of approximately 50°-70° C., so that a further drying of the particles occurs, while the other half of the second fluidized bed has a temperature of approximately 25°-35° C., in order to cool and condition particles. In order to prevent condensation from occurring on the wall 9, in particular the conical part, under the influence of the cold air from the second fluidized bed, said wall 9 can be, for example, a double-walled type.

Reference number 16 indicates the discharge pipe for discharging spray-dried particles from the device according to the present invention.

Figure 2:
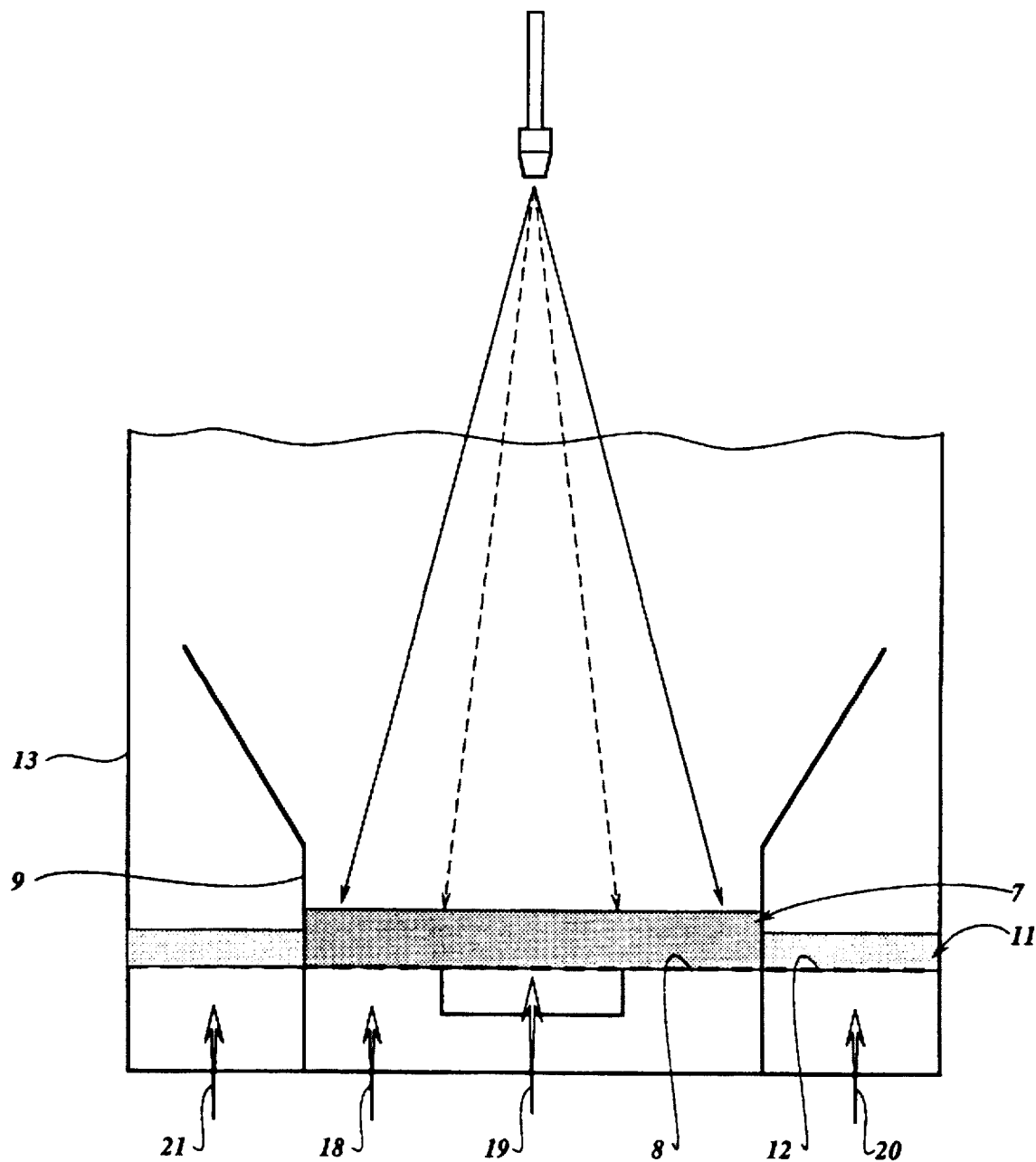
FIG. 2 shows diagrammatically a section of the underside of the device according to the present invention.

FIG. 2 shows a section of the first and the second fluidized be, with the gas supply to the different beds. The fluidizing gas stream main flow fed through the first fluidized bed is indicated by reference number 18. The fluidizing gas stream partial flow, differing from the main flow, is produced by means of an airbox and is indicated by 19. The gas streams through the second fluidized bed, 20 and 21, can be the same or can differ in, for example, temperature.

The method for preparing a spray-dried product using the device according to the present invention is as follows.

A liquid to be spray-dried is guided by way of pipe 4 to the distribution element 3, where the liquid is atomized, forming droplets, by the distribution element 3. At the same time, warm gas and solid substance are supplies by way of supply pipe 5 and supply system 6 respectively to the stream of droplets from the distribution element 3. Agglomeration of particles occurs through bringing the atomized droplets into contact with the solid substance. Partial drying of the atomized droplets and/or the solid substance can occur before and after agglomeration.

By in particular making use of a supply system 6 which is adjustable in distance relative to the distribution element 3, it can be determined at what stage after the atomization the droplets come into contact with the solid particles. By means of this adjustment, an agglomerate of the abovementioned capillary type or the funicular or pendular type can be obtained.

The weight ratio between solid substance and liquid advantageously lies in the range ½-2, preferably between 1 and 2, so that the relative moisture content of the combined streams of droplets and solid substance is low. The average moisture content consequently falls in the first section in the drying chamber 2, with the result that the stickiness decreases.

The following values are given by way of illustration of the ration between the quantities by weight of solid substance and liquid used in the method according to the present invention compared with the prior art.

| Product | s:l* (A) | s:l* (B) |
| --- | --- | --- |
| skimmed milk | 800:450 (1.78) | 225:500 (0.45) |
| whey | 1000:700 (1.43) | 225:500 (0.45) |
|  | 800:700 (1.14) |  |
| whole milk | 750:450 (1.67) | 150:450 (0.33) |
|  | 550:450 (1.22) |  |
| yeast | 600:350 (1.71) |  |
|  | 400:350 (1.14) |  | s: solid substance
l*: liquid
(A): method according to the present invention
(B): method according to the prior art In the first drying section, on the one hand, at a position which may be adjustable or otherwise, droplets are bound to the surface of the solid particles supplied, while, on the other hand, the average moisture content of the product decreases greatly due to both the addition of relatively large quantities of solid particles to the stream of droplets from the distribution element 3 and the high temperature inside the drying chamber 2.

As shown in FIG. 1, the combined streams of droplets from the distribution element 3 and solid particles fall into the first fluidized bed 7, where these—partially dried—streams are received and mixed intensively with already further dried solid substance and warm gas present there. During this drying, the thermoplastic limit of the product is usually passed.

The distance from the distribution element 3 to the first fluidized bed 7, more particularly the bottom plate 8 of the first fluidized bed 7, combined with the spraying angle, is preferably selected in such a way that the stream fully penetrates into the centre of the bottom plate 8 of the first fluidized bed 7. The ratio between the extent of drying of solid particles in the first section in the drying chamber 2 and that in the first fluidized bed 7 is one of the factors which determines the size of the device; the more drying occurs in the fluidized bed, the smaller the device can be.

The stream entering the bed, essentially consisting of agglomerates of solid particles and droplets from the distribution element and gas, causes the drying gas supplied from the underside of the fluidized bed to deflect sideways. As a result of this, the incoming stream of agglomerates in the centre of the bed is isolated, which prevents the still moist and sticky particles from coming into contact with the wall 9 of the first fluidized bed 7. The formation of deposits on this wall 9 is avoided in this way.

Already dried particle-type material is conveyed by way of the opening 10 in wall 9 of the first fluidized be 7 from the first fluidized bed 7 to the second fluidized bed 11. In the first part of the second fluidized bed 11 the solid particles are conveyed by means of warm drying gas in plug flow in the direction of the outlet. This produces further after-drying of the product. In the second part of the second fluidized bed 11 the particles are conveyed by means of a cold gas in the direction of the outlet, so that the particles are cooled and conditioned, in order to permit sieving, conveyance, storage and packaging of the product without the product properties being adversely affected. In addition to its function as a drying and/or cooling unit for solid particles, the second fluidized bed 11 can serve to prevent sticking of powder particles to the wall of the drying chamber 13. Passing a film of relatively cold air without moist powder along the wall of the drying chamber 13 prevents the particles from being deposited on the wall 13 of the drying chamber. This is partly why the soiling of the device is minimal. The air along the wall 13 of the drying chamber 2, which is supplied both by way of supply pipe 5 and by way of the fluidized beds 7, 11, can leave the drying chamber by way of discharge pipe 14. After separation in a cyclone 15, the solid particles can be returned to the system. Since the waste gas is at a relatively low temperature, the particles entrained by the waste gas are less sticky, so that, by comparison with known devices, less soiling of the separating device (cyclone) occurs. Due to the fact that essentially all waste gases from the device pass into the top of the drying chamber, one discharge pipe 14 and separating device 15 will suffice.

It has been found that the required cubic volume of the device according to the present invention is only 20 to 40% compared with the conventional devices, and that the energy consumption is 10 to 30% lower. Besides, when the device according to the present invention is used, the formation of deposits on the wall 13 of the drying chamber 2 or on the wall 9 of the first fluidized bed 7 is largely prevented. In this case, by means of the device and the method according to the present invention, a very broad range of products can be processed to a high standard.

What is claimed is:

1. Device for preparing a spray-dried product, at least comprising a drying chamber with a distribution element placed therein for atomizing liquid to be spray-dried, means for supplying drying gas, and first and second fluidized beds, each comprising at least one bottom plate with openings which has gas supply means opening out at the underside thereof and means for discharging of spray-dried product form the device, wherein inside the drying chamber, opposite the distribution element, said first and said second fluidized beds are placed, said beds being connected to each other and having a first and a second bottom plate respectively with openings, in such a way that a stream of droplets from the distribution element falls essentially into the first bed, and conveyance of material from the first bed to the second bed can take place.

2. Device according to claim 1, wherein the second fluidized bed is placed in an essentially annular manner around the first fluidized bed.

3. Device according to claim 1, wherein the first bottom plate with openings of the first fluidized bed is surrounded by a wall extending essentially parallel to the axis of the distribution element.

4. Device according to claim 1, wherein the first fluidized bed comprises an essentially cylindrical bed, comprising a first, essentially circular bottom plate with openings which are surrounded by an essentially cylindrical wall, the centre point of the first bottom plate lying in line with the axis of the distribution element, while the second fluidized bed comprises an essentially annular bed, placed concentrically around the first bed and comprising an essentially annular second bottom plate with openings which is surrounded by the cylindrical wall of the first bed and the outside wall of the drying chamber.

5. Device according to claim 1, wherein at least two gas supply means which can be controlled individually are placed at the underside of the bottom plate of the second fluidized bed, in which case the gases supplied by the separate gas supply means can differ in temperature.

6. Device according to claim 1, wherein the surface of the underside of the bottom plate of the first fluidized bed is partially covered by gas supply means which can be controlled individually and at that point permit a fluidizing gas stream partial flow through the corresponding part of the bottom plate which differs from the fluidizing gas stream main flow through the remaining part of the bottom plate which is not covered by said gas supply means.

7. Device according to claim 1, wherein means are present for supplying solid particles to the stream of droplets from the distribution element.

8. Device according to claim 7, wherein separation means are present to separate fine particles from the gases in the drying chamber; said fine particles constituting at least a part of the solid particles to be supplied to the stream of droplets.

9. Device according to claim 7, wherein the position of the means for supplying solid particles to the stream of droplets atomized from the distribution element is adjustable in distance relative to the distribution element.

10. Device according to claim 1, wherein the drying chamber is cylindrical having a constant diameter over its total length.

11. Method for preparing a spray-dried product, in which a liquid to be spray-dried is supplied to a distribution element which is situated inside a drying chamber and which atomizes the liquid into a stream of droplets, following which the product is dried using at least two fluidized beds, wherein solid particles are supplied to the stream of droplets; the ration of the quantity by weight of solid particles to liquid supplied is greater than or equal to ½; and, using a device comprising a drying chamber with a distribution element placed therein for atomizing liquid to be spray-dried, means for supplying drying gas, and first and second fluidized beds, each comprising at least one bottom plate with openings which has gas supply means opening out at the underside thereof and means for discharging of spray dried product from the device, wherein inside the frying chamber, opposite the distribution element, said first and said second fluidized beds are placed, said beds being connected to each other and having a first and a second bottom plate respectively with openings, the above in such a way that the combined streams of droplets from the distribution element and solid particles fall essentially into the first bed, and conveyance of material from the first bed to the second bed can take place.

12. Method according to claim 11, wherein the solid particles are at least fine particles which are entrained in the upward gas stream inside the drying chamber.

13. Method according to claim 11, wherein the position at which the stream of solid particles is brought into contact with the stream of droplets from the distribution element is set depending on the desired end product.

* * * * *

UNITED STATES PATENT AND TRADEMARK OFFICE
CERTIFICATE OF CORRECTION

PATENT NO. : 5,782,011
DATED : July 21, 1998
INVENTOR(S) : Boersen et al.

It is certified that error appears in the above-identified patent and that said Letters Patent is hereby corrected as shown below:

In Column 1, line 18, after "spray-drying" insert --device, in which a liquid to be spray-dried is sprayed--.

Column 3, line 20, replace "ration" with --ratio--.

Column 5, line 3, after "be" insert --increased locally and optimum mixing conditions can be--.

line 29, before "temperature" insert --a--.

line 54, replace "supplies" with --supplied--.

Column 6, line 9, replace "ration" with --ratio--.

line 61, replace "be" with --bed--.

Column 7, line 41, replace "form" with --from--.

UNITED STATES PATENT AND TRADEMARK OFFICE
CERTIFICATE OF CORRECTION

PATENT NO. : 5,782,011
DATED : July 21, 1998
INVENTOR(S) : Boersen et al.

It is certified that error appears in the above-indentified patent and that said Letters Patent is hereby corrected as shown below:

Column 8, line 46, replace "frying" with --drying--.

Signed and Sealed this

Second Day of November, 1999

Attest:

Q. TODD DICKINSON

Attesting Officer

Acting Commissioner of Patents and Trademarks